Aug. 30, 1960 R. D. KISSINGER ET AL 2,950,568
GLASS BEADING MECHANISM FOR ELECTRON GUNS
Filed Oct. 11, 1956 5 Sheets-Sheet 1

INVENTORS
RICHARD D. KISSINGER
& ROBERT F. MAILE
BY *William A. Balcunk*
ATTORNEY

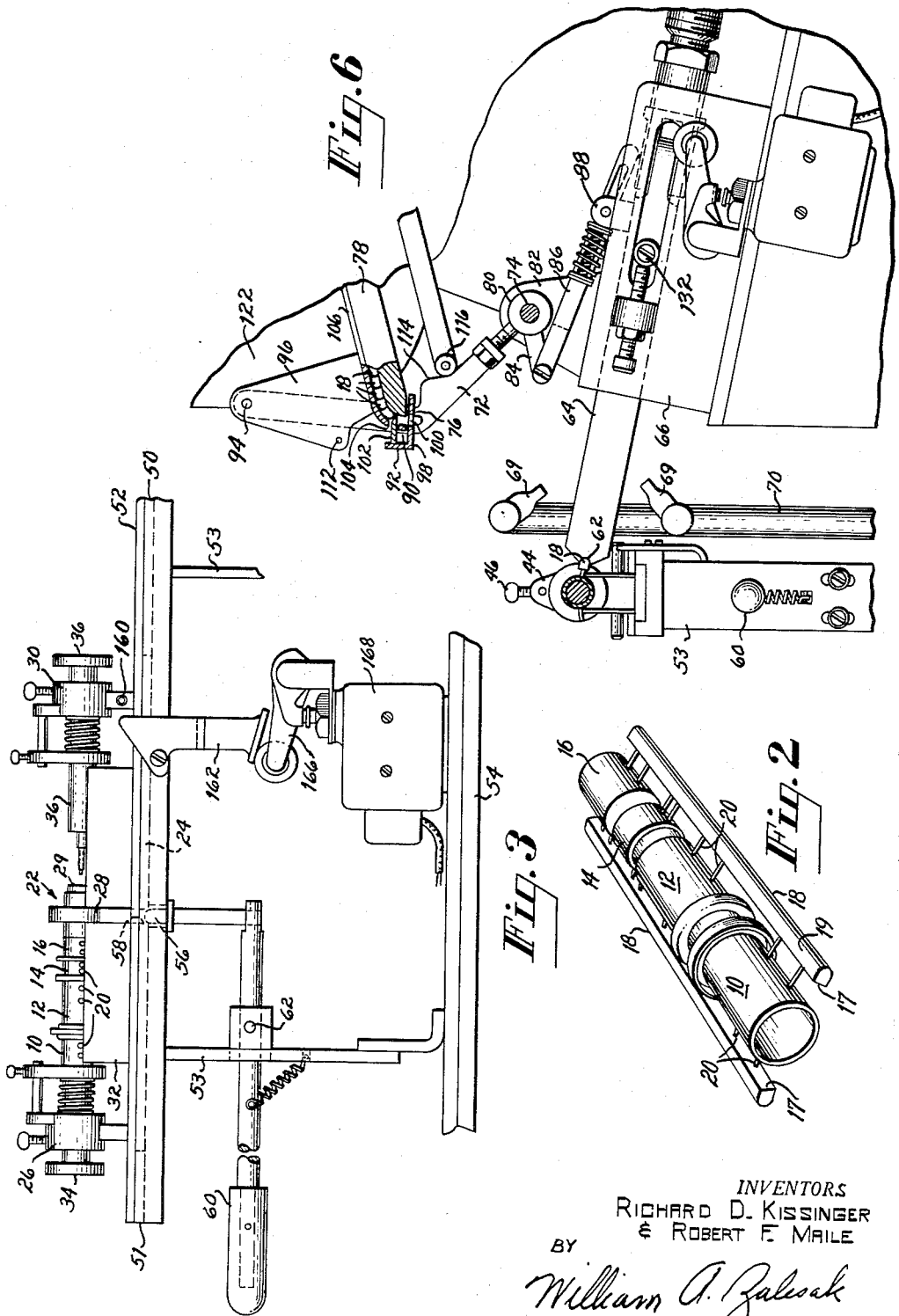

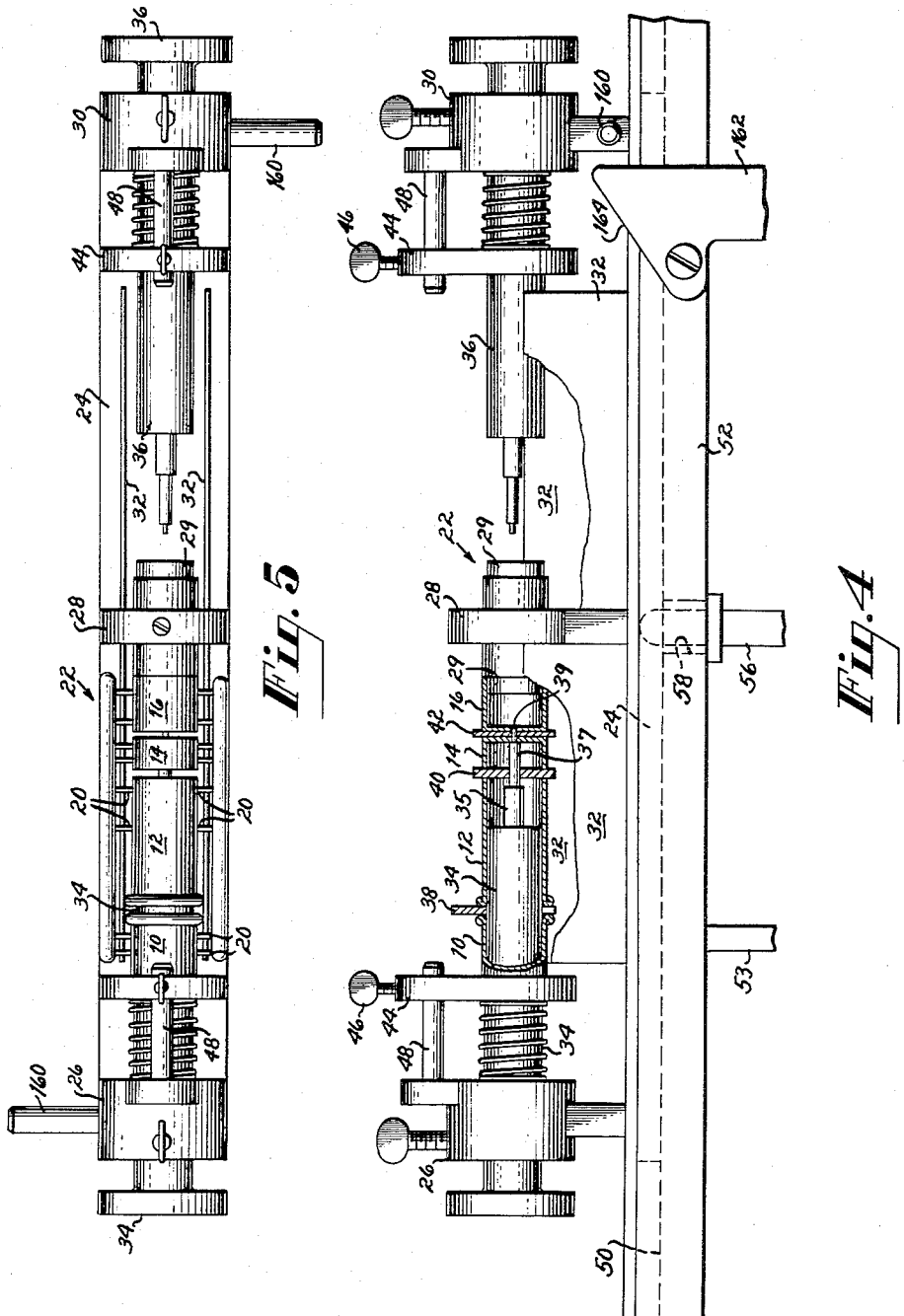

Aug. 30, 1960  R. D. KISSINGER ET AL  2,950,568
GLASS BEADING MECHANISM FOR ELECTRON GUNS
Filed Oct. 11, 1956  5 Sheets-Sheet 4

INVENTORS
RICHARD D. KISSINGER
& ROBERT F. MAILE
BY
William A. Zalusek
ATTORNEY

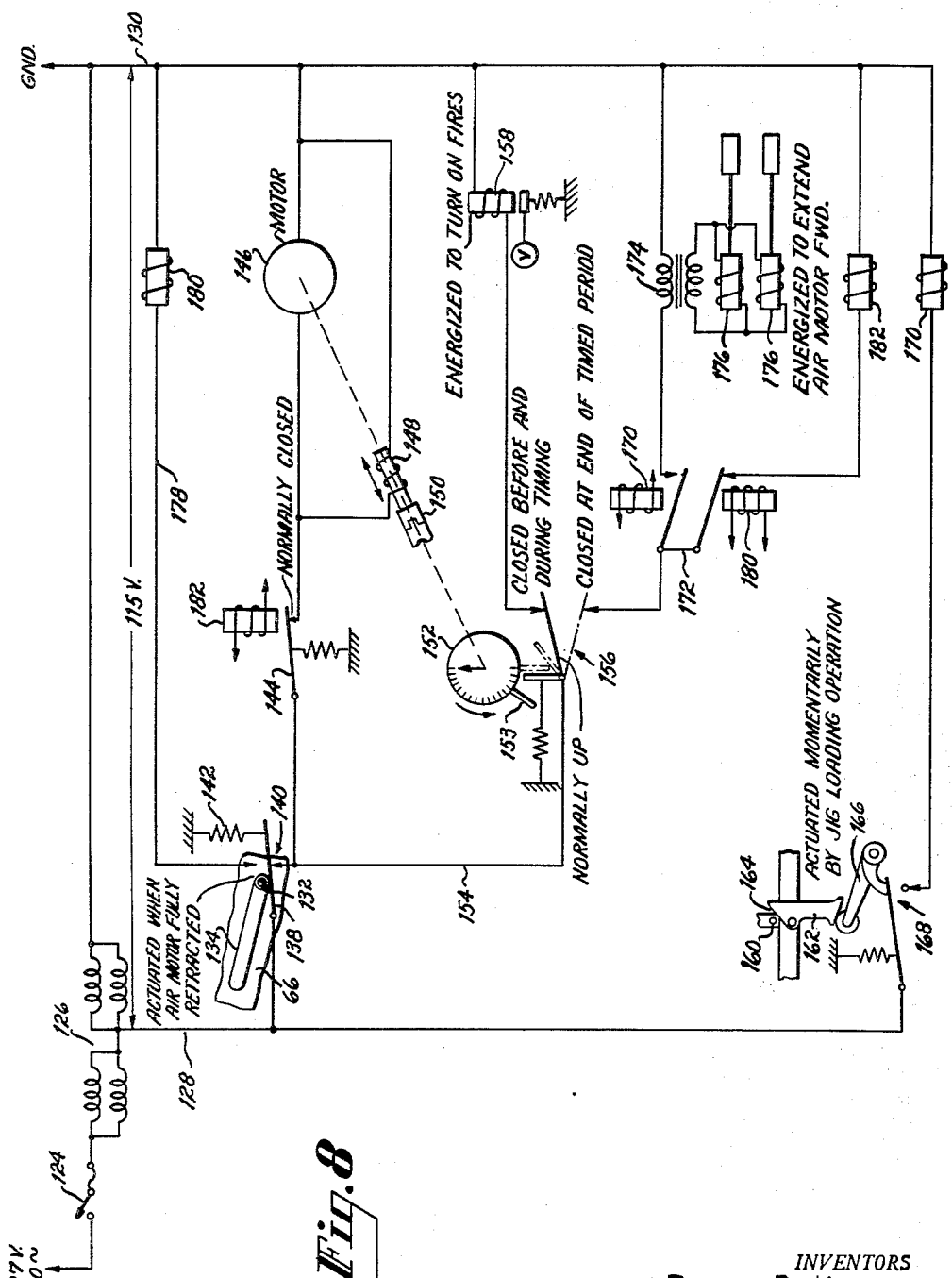

United States Patent Office 2,950,568
Patented Aug. 30, 1960

2,950,568

GLASS BEADING MECHANISM FOR ELECTRON GUNS

Richard D. Kissinger and Robert F. Maile, Lancaster, Pa., assignors to Radio Corporation of America, a corporation of Delaware Filed Oct. 11, 1956, Ser. No. 615,388

8 Claims. (Cl. 49—1)

This invention is directed to an apparatus for the mounting of aligned electrode structures, and particularly to a machine for fastening a plurality of electron gun electrodes to a glass bead.

A cathode ray tube utilizes an electron gun structure mounted within an evacuated envelope. The gun normally comprises a plurality of beam forming and accelerating electrode parts mounted as a unitary structure. The electron gun parts are normally fixed in a spaced relationship in order to maintain a predetermined spacing between the electrodes during the life of the tube. A method of mounting these gun electrodes in fixed spaced relation includes the welding of short studs or tabs on the external portions of the electrodes. In assembling the electrodes, the studs are aligned with each other and fixed into a solid glass rod whereby a rigid mounting of the electrode elements is maintained at all times. It has been common practice to align the gun electrodes on a mandrel with spacer elements which maintain the electrodes in the desired spaced relationship. The gun parts are oriented on the mandrel so that the studs fixed to the parts are in alignment parallel with each other in a common plane. The parts are then fixedly clamped by the mandrel and are held tightly until the glass rod is securely fastened to the aligned studs. The glass rods are attached by first heating the glass to a softened molten condition at which point the aligned studs are pressed into the glass rod along its length and held there until upon cooling, the glass of the rod firmly grips the metal studs and holds the electrode parts in their fixed relationship. Normally, a plurality of glass rods are fastened to the same set of electrode parts to form a rigid sub-assembly of the electron gun.

It has been the practice to assemble the gun electrodes in the manner described above by hand operated techniques. This practice has been notoriously slow and dependent upon the skill and experience of the operator.

It is therefore an object of this invention to provide an electrode assembling device which is free from an excessive amount of hand operation.

It is a further object of this invention to provide a piece of apparatus for assembling electrodes in spaced relationship and with a minimum of hand operation.

It is a further object of this invention to provide an apparatus for assembling electrodes of an electron gun in spaced relationship wherein the apparatus is of automatic operation.

The invention is directed to a machine for the assembling of electrode elements into a sub-assembly of an electron gun for cathode ray tubes. The novel apparatus provides for the automatic feeding of glass rods to a beading device. Gas fires are automatically applied to the glass rod to soften the glass and an electrical timing system controls the application of the softened glass rod to the electrode structure. The operation of the machine is semi-automatic, in that it is loaded by an operator which starts the timing cycle to control the operation of the machine automatically through one complete cycle.

Figure 1 consists of a partial end view of a novel electrode beading machine in accordance with the invention.

Figure 2 is a partial assembly of an electron gun of a type processed by the machine of Figure 1.

Figure 3 is a partial view of the device of Figure 1 showing a jig and mandrel supported by the machine.

Figure 4 is an enlarged longitudinal view of the jig and mandrel of Figure 3.

Figure 5 is a plan view of a jig and mandrel of Figure 4.

Figure 6 is a partial view of the machine of Figure 1 at a different stage of operation.

Figure 8 is a schematic wiring diagram of the control system of the machine of Figure 1.

Figure 1:
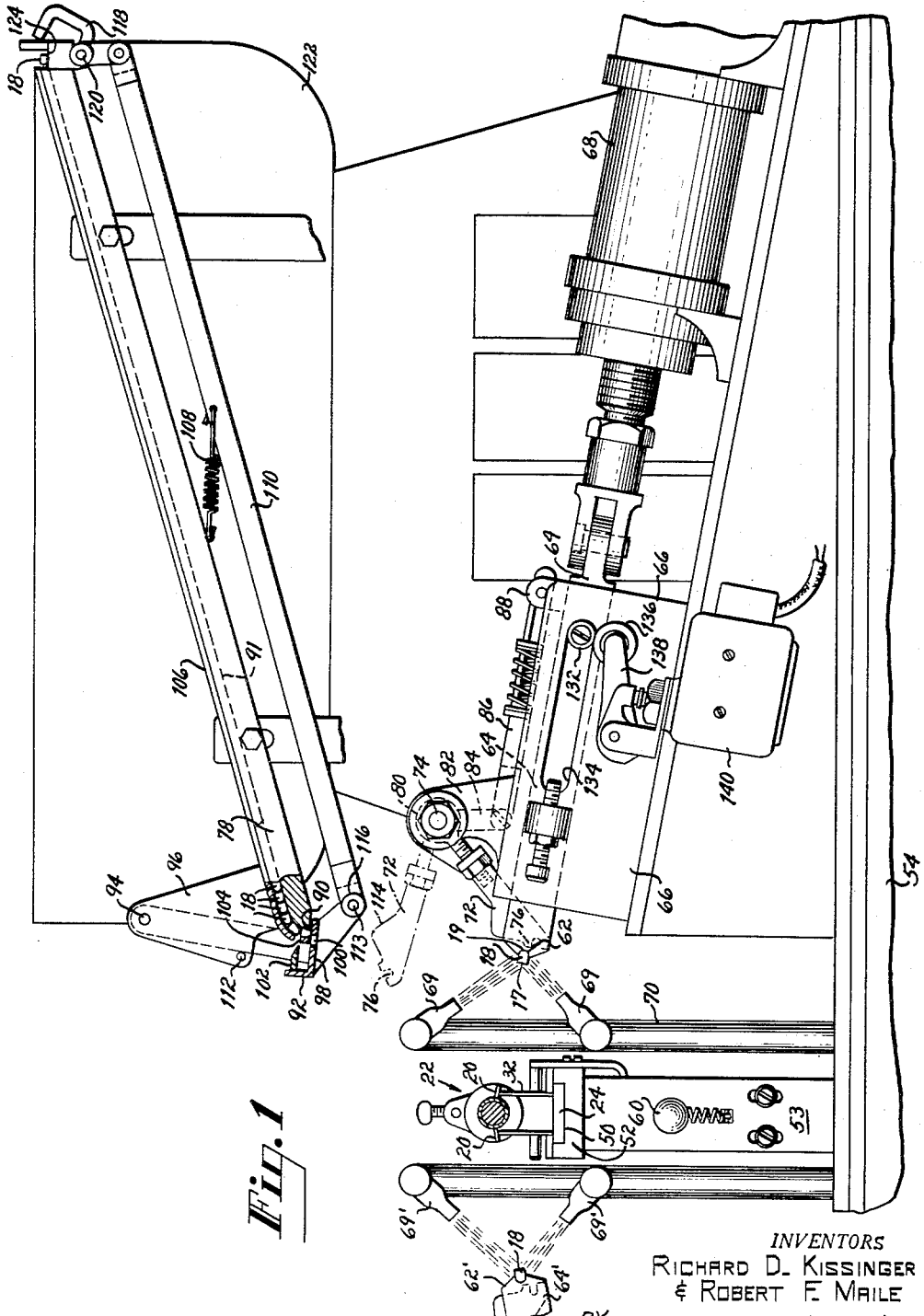

A machine in accordance with the invention for assembling electrode parts for an electron gun is shown in Figure 1. This machine is adapted to assemble electrode structures into a sub-assembly of an electron gun for a cathode ray tube. The following description of the machine is directed toward its application to the fabrication of an electron gun assembly for a cathode ray tube. The invention of the machine is not, however, limited to this specific usage, since by merely changing of certain fixtures, it is possible to utilize the machine for the assembly of different shaped structures and for different purposes.

An electron gun structure for which the machine of the invention is adapted is shown specifically in Figure 2. This structure is a sub-assembly of an electron gun, which is used in a cathode ray tube. The electron gun of such a tube is one which forms the electron emission from a thermionic cathode into an electron beam and accelerates and directs the beam towards a target within the tube. The structure shown in Figure 2 is a portion of such an electron gun and comprises in this specific example a plurality of cylindrical electrodes 10, 12, 14 and 16. These electrodes, are mounted in a fixed spaced relationship with each other to provide, during tube operation, electrostatic fields between adjacent ends of the electrodes for forming electrons into a beam.

It has been found advantageous in the fabrication of cathode ray tubes to assemble such electrodes in a fixed mount sub-assembly which can be subsequently mounted within the tube envelope. A type of mounting means utilized for such assembly includes a plurality of metal studs 20 welded to the outer portions of the cylindrical electrodes 10, 12, 14 and 16. One type of assembly utilizes studs 20 welded to opposite sides of the electrode cylinders. To assemble the several electrodes, a glass rod 18 is heated to a softening temperature and with the studs 20 of the several electrodes aligned parallel to each other in a common plane the studs are pressed into the softened glass rod, which upon cooling and hardening firmly grips the studs 20 to hold the several electrodes in a rigid assembly. In a like manner, a second rod 18 is applied to the studs 20 on the opposite side of the several electrodes. The mount assembly thus formed need not be limited to two glass rods 18 but may also have more, as for example, three glass rods equally spaced around the several electrodes.

To hold the electrodes 10, 12, 14 and 16 in their predetermined spaced relationship during their assembly, the electrodes are mounted into a jig 22 which is shown in Figures 3, 4 and 5. Jig 22 consists of a base plate 24, supporting three end blocks 26, 28 and 30 and a pair of side plates 32, one on each side of the base plate 24. The jig 22 is a double jig, on which a pair of electron gun sub-assemblies may be simultaneously fabricated. A pair of mandrels 34 and 36 are supported respectively by end blocks 26 and 30. As shown in Figures 4 and 5 specifically, each mandrel consists of a rod having reduced portions which are threaded through the respective gun parts. For example, in Figure 4 there is shown cut-away portions of the electrodes 10, 12, 14 and 16, through which the successively reduced portions 35, 37 and 39 of mandrel 34 are threaded. The electrode parts are positioned on the mandrel 34 with predetermined spacings between them, set by the use of spacer elements 38, 40 and 42.

In preparation for the assembly of the several electrodes 10, 12, 14 and 16, each is provided with studs 20 welded to its outer walls. As shown, each electrode is provided with four studs, two on each side of the electrode. The studs on opposite sides of the electrode may be spaced 180° apart. However, in the example shown in Figures 1, 2, 4 and 5 the studs on opposite sides of each electrode are positioned at 170° since the finished gun sub-assembly, shown in Figure 2, is designed for use with two other similar assemblies, as a nested group for a tri-color picture tube.

The electrodes 10, 12, 14 and 16 are assembled on the jig 22 by placing the electrodes with their respective studs 20 resting on the two side plates 32 of the jig, and as shown in Figures 3 and 5, for example. The mandrel 34 is then threaded through the central aperture of each electrode and the spacers 38, 40 and 42 are placed between the respective electrodes to provide the proper spacing. The end electrode 16 of the gun assembly is supported in a telescoped manner on a reduced portion 29 of the end block 28. A locking plate 44 is spring pressed along each mandrel 34, 36 to contact the adjacent end of electrode 10 and to force the several electrodes against their respective spacers. A thumbscrew 46 is used to lock the plate 44 in this position, during the beading operation. Thumbscrew 46 seats against rod 48 which slides through an aperture in plate 44 and which is rigidly mounted to the end plate 26 or 30 of the jig. In a like manner, as described above, similar gun parts are threaded onto the second mandrel 36 of jig 22.

After the jig 22 has been loaded it is then inserted into the machine of Figure 1 by fitting the base plate 24 of the jig into the slide channel 50 of a track 52 supported by plate structures 53 from the machine base plate 54. Jig 22 is locked into operative position by means of a locking pin 56 (Fig. 3) which is spring pressed upwardly into an aperture 58, in the bottom of the track 52. A manually operated lever 60, pivotally mounted on support plate 53, enables the operator to release the jig at the completion of the beading operation.

As shown in Fig. 1, prior to fixing the glass beads 18 to an electrode assembly, the beads 18 are held in shaped jaws or apertures 62 of a sliding bead block 64. Each of the glass beads 18 is shaped to have a flat planar surface 17 and a rounded surface 19. In assembling the structure of Figure 2, the flat surface 17 is positioned so that when the studs 20 are forced into the softened glass rod 18, they will enter through the flat surface 17. The bead carrying jaws 62 of the slide blocks 64 are shaped to fit the curved surface 19 of each glass bead and to hold the glass bead with the flat face 17 of the bead directed toward the aligned studs 20 of the gun assembly; and as shown in Figures 1 and 6, for example.

Bead block 64 is supported in sliding relationship within a supporting slide 66. A reciprocating air motor 68 is used to power-actuate the bead block 64 within the slide block 66. As shown in Figures 1 and 6, for example, the direction of motion of the block 64 is at an angle to the horizontal, but in a plane including the aligned studs 20 resting on the side plate 32 of jig 22.

Gas fires are applied to heat the glass bead rod 18 held in the jaws 62 of the bead block 64. These fires are directed onto the bead 18 from gas jets 69, as shown in Figures 1 and 6, for example, and which are in turn connected to a gas manifold 70 connecting the jets 69 to a source of a gas fuel mixture. When the bead 18 has been sufficiently softened by the flames from jets 69, the air motor 68 is actuated to push bead block 64 through the slide block 66 into stud engaging position, as shown in Figure 6. During this operation, the fires are turned off to prevent undue heating of the bead block 64. The bead block then is immediately returned back to its bead loading position, shown in Figure 1.

Figure 7:
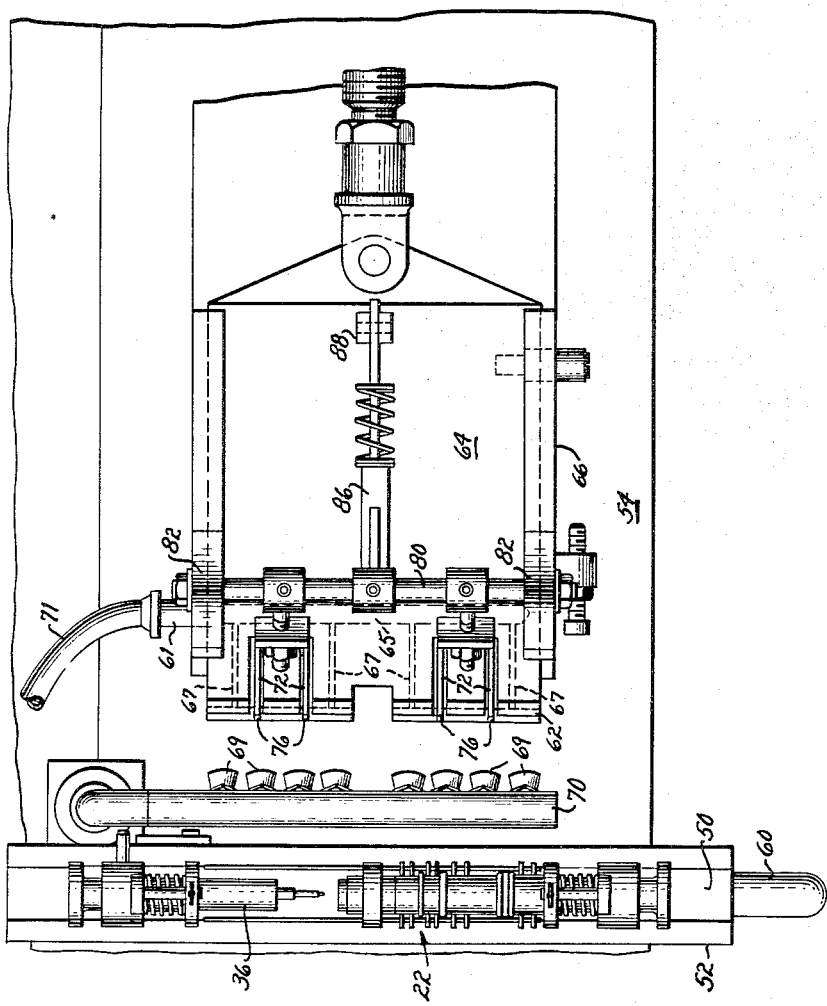
Figure 7 is a plane view of part of the machine of Figure 1.

Figure 7 is a plan view of a portion of the beading mechanism shown in Figures 1 and 6. The bead block 64 is formed with a bore 65 drilled laterally through the block to form an air passage. Leading from the air passage of bore 65 are additional air passages 67 leading through the block into the several supporting jaws 62 of the bead block 64. The bore 65 is closed at one end as shown in Figure 7 while the other end extends to the outer surface of block 64 to which a fixture 61 is attached for coupling through a flexible hose 71. During machine operation, the hose 71 is connected to an exhaust pump which exhausts air from the bore 65 and air passages 67. When the glass beads 18 are fed by arms 72 (see also Figs. 1 and 6) into the jaws 62 of block 64 this air flow or suction through passages 67 retains the glass beads 18 in the jaws 62 while they are being softened by the fires and as they are moved into the beading position shown in Figure 6. With the bead block 64 in the beading position of Figure 6 the flow of air to the exhaust system is cut off so that the beads 18 are released when the bead block 64 returns to its normal position shown in Figure 1.

It is also seen from Figure 7 that the bead block 64 feeds a pair of glass rods 18 into the beading position shown in Figure 1 during each cycle of operation. The structure shown in Figures 1, 6 and 7 which are also duplicated on the other side of the machine, as indicated by the partial showing of a bead block 64' and gas jets 69' in Fig. 1. These duplicated parts are not shown more in detail, but are identical in all parts to the structure described. Thus, during tube operation, the jig 22 is loaded with two sets of gun parts as described above. Four beads 18 are heated simultaneously and when the glass has been softened the bead blocks 64 and 64' carry the softened glass beads simultaneously into the beading position shown in part in Figure 6. When bead blocks 64 and 64' return to their normal position shown in Figure 1, jig 22 with its pair of beaded gun assemblies is removed by releasing locking pin 56 and sliding the jig out of the track 52. A new jig 22 is inserted into the loading end 51 of track 52 and positioned so as to be locked by pin 56. Upon sliding jig 22 into its position to be locked, a horizontally disposed pin 160 on the jig rides over and trips a switch lever 162 to automatically start the beading cycle and in the manner to be described below.

As shown in Figs. 1 and 6, an automatic bead loading mechanism is provided to place a new bead 18 into the jaws 62 of bead block 64 after each beading operation. This loading mechanism includes bead feeding arms 72 pivotally mounted at 74 on the bead block slide 66. The feeding arms 72 include pairs of bead supporting jaws 76 for carrying each glass bead 18 from a bead magazine 78 to the supporting jaws 62 of the bead block 64. The reciprocating motion of bead block 64 is utilized to actuate the feeding arms 72. The several feeding arms 72 are all rigidly mounted to rotating shaft 80 mounted between two supporting ears 82, one positioned on each side of the slide block 66. Also, rigidly fixed to the rotating shaft 80 is a lever arm 84 connected by a linkage 86 to a fixed ear 88, an integral portion of the bead block 64. Thus, as shown in Figure 6, when the bead block 64 moves to the left into bead engaging position with studs 20, linkage 86 swings lever 84 in a clockwise direction to rotate the actuating shaft 80. This moves the feeding arms 72 upwardly, as shown in phantom in Figure 1. When the bead block 64 has reached the stud engaging position, shown in Figure 6, feeding arms 72 have been rotated into the uppermost position under the mouth 90 of the bead magazine 78. Magazine 78 includes a bead track 91, extending from the magazine mouth 90 upwardly to feeding platform 124. Beads 18 fed onto platform 124 slide by gravity down track 91 until the track is filled with beads 18 in horizontal arrangement.

A gating maximum is provided to feed the beads 18, one at a time, into the respective jaws 76 of the feeding arm 72. This gating maximum includes a bead gate 92, pivotally mounted at 94 from a support member 96 fixed to the bead magazine 78. As shown in Figures 1 and 6 the bead gate 92 includes an L-shaped plate structure having a bottom plate 98 with an aperture 100 in the bottom thereof. Aperture 100 extends lengthwise of plate 98 and is of a size to permit a glass bead 18 to fall by gravity through the plate, when plate 98 is moved into position under the mouth 90 of the bead magazine 78.

Also mounted longitudinally of the bead gate 92 are a plurality of pins 102 having a beveled or sharpened end for projecting into an aperture 104 of the cover 106 of the bead magazine 78. As shown in Figures 1 and 6, the beveled pins 102 are spaced from the bottom plate 98 of the bead gate and are so proportioned to cooperate with the plate 98 to form a feeding or gating mechanism. When the bead feeding arms 72 are in the downward position as shown in Figure 1, spring 108 connected between the bead magazine 78 and a rod linkage 110 forces the bead gate 92 to the left until it strikes a stationery stop pin 112. The rod link 110 is connected to the bead gate 92 by a pivotal connection pin 113. In this position, the beveled pins 102 of the bead gate are as shown in Figure 1, and the bottom plate 98 of the bead gate closes the mouth 90 of the magazine track 91. The glass rods 18 press by gravity onto the plate 98 of the bead gate 92. When the feeding arms 72 are raised upwardly into contact with the mouth 90 of the bead magazine as shown in Figure 6, a cam surface 114 strikes a cam follower wheel 116 rotatably mounted on the pin 113. As the bead feeding arm 72 is continued upwardly, the bead gate 92 is swung toward the right, as shown in Figure 6 so that the beveled pins 102 enter apertures 104 in the bead magazine cover 106. The beveled points of pins 102 are forced between the first and second beads 18 resting in the mouth 90 of the magazine. Simultaneously the aperture 100 in the bottom plate 98 of the gate is moved to the right until the first bead 18 falls through aperture 100 into the bead receiving jaws 76 of the feeding arms 72. The several parts of the apparatus are so supported and adjusted that the bead 18 falls into the jaws 76 as the bead feeding arm 72 reaches its uppermost position. At this position the beveled pins 102 prevent the feeding of any other rods 18 into the magazine mouth 90, which would jam the operation of the mechanism.

As the bead block 64 returns to its normal position shown in Figure 1, the feeding arms 72 swing downwardly through actuation by linkage 84 and 86 to the bead block 64. This downward movement of bead feeding arms 72 releases the bead gate 92, which is swung to the left by action of the spring 108. This motion carries the gating apertures 100 out of alignment with the track mouth 90 and also carries the beveled pins 102 out of the apertures 104. The glass rods 18 released by the pins 102 are thus allowed to fall onto the bottom plate 98 of the bead gate, and are thus in position to be fed through the apertures 100 onto the feeding arms 72 when the feeding arm is raised to its uppermost position during the next cycle. The linkage rod 110 also actuates feeding fingers 118, which are pivotally mounted on a shaft 120 of the bead magazine. A vibratory parts feeder 122, is used to feed the glass rods 18 to the horizontal platform 124 at the top of the bead magazine 78. On each reciprocation of the linkage bar 110 the fingers 118 are pivoted counterclockwise to push a glass rod 18 down the slide track 100.

The several operations of the machine as described above are arranged to occur automatically after a loaded jig 22 is positioned for beading. Figure 8 is a schematic representation of an electrical system utilized in the operation of the beading machine. The device is operated from a 60 cycle, 127 voltage source, as indicated in Figure 8. To place the device in operation, a master switch 124 is closed by an operator to connect a transformer 126 to the source of voltage. The transformer provides a constant 115 volts alternating current voltage between a line 128 and a ground line 130. As shown in Figure 1, the bead block 64 carries a pin 132 which projects through an elongated aperture 134 in the side wall of the bead block slide 66. In the retracted position, shown in Figure 1, pin 132 contacts a cam wheel 136 on a switch lever arm 138 which actuates a switch 140 and holds the switch 140 in a depressed position, as shown in Figures 1 and 8. Switch 140 is spring urged by a spring 142 (Fig. 8) to an upward position when pin 132 rides off the switch lever arm 138.

However, with bead block 64 in its normal position of Figure 1, the operator on closing the master switch 124 permits current to flow through switch 140 and a normally closed switch 144 to actuate a timer motor 146 and a clutch solenoid 148. Actuation of solenoid 148 causes a clutch 150 between the motor 146 and a timer switch 152 to become engaged so that the motor will start to drive the timer switch 152. Simultaneously, current flows through line 154 through switch 156, which is in the position shown in Figure 8, to energize a solenoid control 158, which turns a normally closed valve V to let gas into the manifold 70 of the gas burners 69 and 69'. A pilot light, which is constantly burning lights the fires so that the glass beads 18 in the slide block jaws 62 and 62' are heated.

Thus, closing the master switch 124 causes the fires of gas jets 69 and 69' to start burning immediately to heat up the glass rods 18 in preparation for beading. Normally, a 15 second setting is applied to the timer switch 152 before a lever arm 153 swings around to close the switch 156 into its downward position so as to actuate the air motors 68 which carry the bead block 64 into its beading position. However, before this second operation can take place the operator must load a beaded jig 22 into the supporting track 50. The action of sliding the jig base plate 24 into the track 50 is such that the pin 160, fixed to the end block 30 contacts the switch actuating lever arm 162. The pin 160 contacts the cam surface 164 of lever arm 162 to swing lever arm in a clockwise direction and cause it to momentarily actuate a switch lever arm 166 in a counterclockwise direction. Lever arm 166, thus, momentarily closes switch 168 (Figures 3 and 8) to actuate solenoid 170, which sets switch 172 in its upward position (Figure 8). After the 15 second delay, the arm 153 of timer switch 152 closes switch 156 in its downward position thus connecting transformer 174 to the power source through the preset switch 172. This permits current to flow through the transformer 174, which in turn passes current to a plurality of solenoids 176. These solenoids 176 operate air valves controlling the air motors 68. On opening these valves, the motors are actuated to press the bead blocks 64 and 64' (Figure 1) to the left and into beading position so that the softened glass rods 18 carried by the blocks 64 and 64' are pressed upon the aligned studs 20 of the gun assembly. When the motors 68 have reached their furthest actuated position, as shown in Figure 6, the air valves controlling the motors are automatically cut-off in a well known manner. The motors and the bead blocks 64 and 64' are returned to their normal positions, shown in Figure 1.

However, when the bead block 64 is moved into the beading position, pin 132 rides off the switch control lever 138 and switch 140 is pulled upward by the spring 142. This cuts off the current through the timer motor 146 and also deactivates solenoid 148 to allow the clutch 150 to become disengaged and thus permit the spring wound timer 152 to reset itself. The resetting of timer 152 permits switch 156 to be spring pressed into its upward position, as shown in Figure 8. With switch 140 in its upward position, current is directed into line 178 to actuate solenoid 180 which pulls switch 172 into its downward position. This allows the air motor valves controlled by solenoids 176 to be spring pressed into a closed position, and thus permit the air motor 68 to retract the bead block 64.

With the return of pin 132 to its retracted position shown in Figure 1 and the downward closing of switch 140, the cycle of starting the timer 152 and turning on the bead softening fires through solenoid 158 is begun again. However, if the operator fails to load a new jig into the support track 50, switch 168 will not be closed and the air motors 68 will not be operated as described above. If the failure to load a jig lasts for any length of time, the pin 132 will remain in its retracted position in Figure 1 and merely the timer mechanism 152 will go through its cycle to turn the fires off and on successively by the periodic actuation of solenoid 158. This is because the switch 172 remains in its downward position, and the valve actuating solenoids 176 are never operated. However, switch 172 in its downward position will cause current to pass through solenoid 182 which will open the normally closed switch 144 and thus allow the timer switch 172 to be reset.

As mentioned above, the switch 172 allows the operator to remove a beaded jig 22 and reinsert a new jig for beading into the support track 50. A continuous supply of loaded jigs can be furnished to the operator so that the machine can be kept operating more or less continuously through the successive loading of jigs onto the support track 50.

What is claimed is:

1. A beading machine for attaching a thermoplastic bead to an electron gun structure having a plurality of aligned mounting elements, said machine comprising, a movable slide for holding said thermoplastic bead, a support slidably mounting said slide for movement along a path between a first position and a second position, means spaced from said slide support for mounting said electron gun structure with said aligned mounting elements adjacent to said first position, means for moving said slide within said support and between said first and second positions, means for heating said thermoplastic beads to softening temperature, said heating means including a gas manifold, gas burners operatively connected to said manifold, normally closed valve devices connected to said manifold to control the flow of gas to said burners, and control means connected to said valve devices and including a control circuit comprising a source of current and a first switch means in contact with said slide at said second position to close said control circuit to open said valve devices, and a second switch means in said valve control circuit, said second switch means including a timing device for opening said control circuit to permit said valves to close after said slide remains in said second position a predetermined time.

2. A beading machine for attaching a thermoplastic bead to a structure having a plurality of aligned mounting elements, said machine comprising a movable slide for holding said thermoplastic bead, a support slidably mounting said slide for movement along a path between a first position and a second position, means spaced from said slide support for mounting said structure with said aligned mounting elements adjacent to said first position, and power means for moving said slide within said support and between said first and second positions, said power means including a motor and a control means connected to said motor including a control circuit comprising a first switch means in contact with said slide at said second position to close said control circuit for actuating said motor, a second switch means in said control circuit, and a timer mechanism connected to said second switch means to close said second switch means after a predetermined time.

3. A beading machine for attaching a thermoplastic bead to a structure having a plurality of aligned mounting elements, said machine comprising a movable slide for holding said thermoplastic bead, a support slidably mounting said slide for movement along a path between a first position and a second position, means spaced from said slide support for mounting said structure with said aligned mounting elements adjacent to said first position, said structure mounting means including a first portion rigidly fixed relative to said slide support and a second portion thereof mounted movably along a path on said first portion, and power means for moving said slide within said slide support and between said first and second positions, said power means including a motor and a control means connected to said motor, said control means including a control circuit comprising a first switch means in contact with said slide at said second position to close said control circuit, and a second circuit having a second switch means as a part thereof, said second switch means having an element in the path of said second portion to close said control circuit.

4. A beading machine for attaching a thermoplastic bead to a structure having a plurality of aligned mounting elements, said machine comprising a movable slide for holding said thermoplastic bead, a support slidably mounting said slide for movement along a path between a first position and a second position, means spaced from said slide support for mounting said structure with said aligned mounting elements adjacent to said first position, and power means for moving said slide within said support and between said first and second positions, said power means including a motor and a control means connected to said motor, said control means comprising a control circuit, means in said circuit and in contact with said slide at said second position to close said control circuit for actuating said motor, and a switch means in said control circuit and including a timing device for closing said control circuit after a predetermined time.

5. A beading machine for attaching a thermoplastic bead to an electron gun structure having a plurality of aligned mounting elements, said machine comprising a movable slide for holding said thermoplastic bead, a support slidably mounting said slide for movement along a path between a first position and a second position, means spaced from said slide support for mounting said electron gun structure with said aligned mounting elements adjacent to said first position, said electron gun structure mounting means including a first portion rigidly fixed relative to said slide support and a second portion thereof mounted movably along a path on said first portion, and power means for moving said slide within said slide support and between said first and second positions, said power means including a motor and a control means connected to said motor, said control means including a control circuit comprising a first switch means in contact with said slide at said second position to close said control circuit, a second switch means in said circuit having an element thereof in the path of a part of said first portion to close said control circuit, and a third switch means in said control circuit and including a timing device for closing said control circuit after a predetermined time.

6. A beading machine for attaching a thermoplastic bead to an electron gun structure having a plurality of aligned mounting elements, said machine comprising a movable slide for holding said thermoplastic bead, a support slidably mounting said slide for movement along a path between a first position and a second position, means spaced from said slide support for mounting said electron gun structure with said aligned mounting elements adjacent to said first position, said structure mounting means including a first portion rigidly fixed relative to said slide support and a second portion thereof mounted movably along a path on said first portion, and power means for moving said slide within said slide support and between said first and second positions, said power means including a motor and a control means connected to said motor, said control means including a first control circuit comprising a first switch means in contact with said slide at said second position to close said first switch means, a second switch means in said control circuit having an element thereof in the path of said first portion to close said control circuit, and a third switch means in said first control circuit and including a timing device for closing said first control circuit after a predetermined time, said timing device including a second control circuit comprising said first switch means and a motor for driving said timing device.

7. A beading machine for attaching a thermoplastic bead to an electron gun structure having a plurality of aligned mounting elements, said machine comprising a movable slide for holding said thermoplastic bead, a support slidably mounting said slide for movement along a path between a first position and a second position, means spaced from said slide support for mounting said electron gun structure with said aligned mounting elements adjacent to said first position, means for moving said slide within said support and between said first and second positions, means for heating said thermoplastic beads to softening temperature, said heating means including a gas manifold, gas burners operatively connected to said manifold, normally closed valve devices connected to said manifold to control the flow of gas to said burners, and control means connected to said valve devices and including a control circuit comprising a source of current and a first switch means in contact with said slide at said second position to close said control circuit to open said valve devices, and a second switch means in said valve control circuit, a second circuit connected to said slide moving means for controlling said slide moving means, said second control circuit including said first and second switch means, and power means for moving said slide, said second switch means including a second switch and means holding said switch in a first position to close said first control circuit and to open said second control circuit, said second switch means including a timing device for moving said second switch to a second position to open said first control circuit and close said second control circuit.

8. A beading machine for attaching a thermoplastic bead to an electron gun structure having a plurality of aligned mounting elements, said machine comprising a movable slide for holding said thermoplastic bead, a support slidably mounting said slide for movement along a path between a first position and a second position, means spaced from said slide support for mounting said electron gun structure with said aligned mounting elements adjacent to said first position, means for moving said slide within said support and between said first and second positions, means for heating said thermoplastic beads to softening temperature, said heating means including a gas manifold and gas burners operatively connected to said manifold, normally closed valve devices connected to said manifold to control the flow of gas to said burners, and control means connected to said valve devices and including a control circuit comprising a source of current and a first switch means in contact with said slide at said second position to close said control circuit to open said valve devices, and a second switch means, and power means for moving said slide, said second switch means including a second switch and means holding said switch in a first position to close said first control circuit and to open said second control circuit, said second switch means including a timing device for moving said second switch to a second position to open said first control circuit and close said second control circuit, and a third circuit including said first switch means and solenoid means for opening said second control circuit, said first switch means including structure for normally moving said first switch means to a position opening said first and second control circuits and closing said third circuit to operate said solenoid means to open said second circuit.

References Cited in the file of this patent

UNITED STATES PATENTS

| | | |
|---|---|---|
| 2,174,853 | Bowie | Oct. 3, 1939 |
| 2,482,071 | Simison | Sept. 13, 1949 |
| 2,570,660 | Gamble | Oct. 9, 1951 |
| 2,584,466 | Kaserman | Feb. 5, 1952 |
| 2,600,076 | Schelling | June 10, 1952 |
| 2,707,848 | Pityo | May 10, 1955 |
| 2,741,069 | Wohlman | Apr. 10, 1956 |
| 2,778,966 | Faustina et al. | Jan. 22, 1957 |